(12) United States Patent
Lin et al.

(10) Patent No.: US 6,873,951 B1
(45) Date of Patent: Mar. 29, 2005

(54) SPEECH RECOGNITION SYSTEM AND METHOD PERMITTING USER CUSTOMIZATION

(75) Inventors: Lin Lin, Toronto (CA); Jason Adelman, Toronto (CA); Lloyd Florence, Toronto (CA); Ping Lin, Toronto (CA)

(73) Assignee: Nortel Networks Limited, St. Laurent (CA)

( * ) Notice: Subject to any disclaimer, the term of this patent is extended or adjusted under 35 U.S.C. 154(b) by 137 days.

(21) Appl. No.: 09/672,814

(22) Filed: Sep. 29, 2000

Related U.S. Application Data

(63) Continuation-in-part of application No. 09/281,078, filed on Mar. 30, 1999, now Pat. No. 6,487,530.

(51) Int. Cl.[7] ............................................. G10L 15/06
(52) U.S. Cl. ....................... 704/251; 704/243; 704/275; 379/88.01
(58) Field of Search ................................ 704/244, 251, 704/231, 275, 243; 379/88.01, 88.03

(56) References Cited

U.S. PATENT DOCUMENTS

| | | | | |
|---|---|---|---|---|
| 4,618,984 A | * | 10/1986 | Das et al. ................... | 704/244 |
| 4,811,243 A | * | 3/1989 | Racine ........................ | 345/863 |
| 5,144,672 A | * | 9/1992 | Kuriki ........................ | 704/252 |
| 5,165,095 A | * | 11/1992 | Borcherding ............ | 379/88.03 |
| 5,377,303 A | * | 12/1994 | Firman ........................ | 704/275 |
| 5,664,058 A | | 9/1997 | Vysotsky .................... | 704/243 |
| 5,719,921 A | * | 2/1998 | Vysotsky et al. ........ | 379/88.01 |
| 5,774,841 A | * | 6/1998 | Salazar et al. ............. | 704/225 |
| 5,835,570 A | * | 11/1998 | Wattenbarger ........... | 379/88.03 |
| 5,842,168 A | * | 11/1998 | Miyazawa et al. ......... | 704/275 |
| 5,920,837 A | * | 7/1999 | Gould et al. ................ | 704/251 |
| 6,073,099 A | | 6/2000 | Sabourin et al. ........... | 704/256 |
| 6,088,669 A | * | 7/2000 | Maes .......................... | 704/231 |
| 6,487,530 B1 | * | 11/2002 | Lin et al. .................... | 704/244 |
| 6,792,083 B2 | * | 9/2004 | Dams et al. ............ | 379/88.01 |

OTHER PUBLICATIONS

S. Young et al., The HTK Book (For HTK Version 2.1), Cambridge University, Mar. 1997, Contents, pp 1–8, pp 15–17.

* cited by examiner

*Primary Examiner*—Richemond Dorvil
*Assistant Examiner*—Donald L. Storm

(57) ABSTRACT

A system and method for speech recognition includes a speaker-independent set of stored word representations derived from speech of many users deemed to be typical speakers and for use by all users, and may further include speaker-dependent sets of stored word representations specific to each user. The speaker-dependent sets may be used to store custom commands, so that a user may replace default commands to customize and simplify use of the system. Utterances from a user which match stored words in either set according to the ordering rules are reported as words.

9 Claims, 8 Drawing Sheets

SPEECH RECOGNITION SYSTEM AND METHOD PERMITTING USER CUSTOMIZATION

RELATED APPLICATIONS

This is a continuation-in-part application of U.S. Pat. No. 09/281,078 filed Mar. 30, 1999 now 6,487,530 entitled "METHOD FOR RECOGNIZING NON-STANDARD AND STANDARD SPEECH BY SPEAKER INDEPENDENT AND SPEAKER DEPENDENT WORD MODELS", the contents of which are hereby incorporated by reference.

FIELD OF THE INVENTION

This invention pertains generally to speech recognition, and more particularly to methods and systems for recognizing non-standard speech, and for allowing customized speech recognition.

BACKGROUND OF THE INVENTION

Methods of recognizing and electronically transcribing human speech are known in the art. (See, for example, *The HTK Book*, Version 2.1, Steve Young et al, Cambridge University Technical Services Ltd., March 1997, Chapter 1.) They are generally based on storing mathematical models of spoken words, converting incoming utterances into mathematical models, and attempting to match the models of incoming utterances with stored models of words.

A well known application of this technology is a dictation program for a personal computer (PC), which allows a user to create a text file by dictating into a microphone, rather than by typing on a keyboard. Such a program is typically furnished to the user with associated audio hardware, including a circuit board for inclusion in the user's PC and a microphone for connection to the circuit board.

Typically, a user newly acquiring a dictation program "trains" it (i.e., spends several hours dictating text to it.) The program uses the training speech stream for two purposes: i) to determine the spectral characteristics of the users voice (as delivered through the particular supplied microphone and circuit board) for its future use in converting the user's utterances to mathematical models; and ii) to determine words spoken by the particular user that the program has difficulty matching with its stored mathematical models of words.

A speech-recognition program, such as a dictation program, is typically supplied with a library of stored word models derived from the speech of a large number of speakers. These are known as speaker-independent models. For most users, there are some words that do not match the speaker-independent models. For some users, this failure to match the models may be because of accents, regional speech variations, or vocal anomalies. Such users will be referred to herein as "non-standard users".

For words of a particular user, identified during the training phase as difficult to reliably match against speaker-independent models, the dictation program "learns" (i.e., derives and stores) word models from the particular user. These are known as speaker-dependent models or user-trained models. The user-trained model for a word is stored in place of the original speaker-independent word, which is no longer used for recognizing the particular user's speech. Non-standard users typically require a greater number of user-trained models than standard users.

An emergent application of speech recognition is in voice messaging systems. The traditional means for a user to access such a system is to dial in by telephone, and request message services by pressing keys on the telephone's key pad, (e.g., "1" might connote PLAY, "2" might connote ERASE, etc.). The user may first be required to provide an identification of himself and enter a password, or the system may assume an identity for the user based on the extension from which he calls.

Applications are emerging wherein a user operates the voice messaging system by voice commands—e.g., by saying the words PLAY, ERASE, etc., rather than by pressing code keys on the keypad. To initiate a call, a user might speak the called party's number or name rather than "dial" the number by pressing keypad digits. Typically, a manufacturer defined default set of voice commands may be uttered by users in to operate the system. This set of commands must typically be learned by the user, to allow the user to effectively operate the system. This learning is often quite cumbersome for users, who, as a result, may not fully utilize available commands and features. This learning difficulty is compounded by the fact that each manufacturer uses its own set of commands. A user's migration to a new system is thus often accompanied with a need to learn a new set of commands.

As well, there are difficulties encountered in recognizing speech in a voice messaging system that are not encountered in a dictation system including, for example: i) users may find it onerous to expend several hours training a voice messaging system; ii) unlike the single microphone and audio circuit board of a dictation system, users of a voice messaging system might call the system from many different telephone instruments which might connect over paths differing in quality from call to call, and which might use different kinds of networks from call to call; and iii) for many users, the default set of commands used to navigate through the options available in a voice messaging system are not intuitive. These difficulties compound the difficulties with recognition of utterances from non-standard users.

An approach that has been tried to aid the recognition of utterances by non-standard users is to regenerate the speaker-independent models, including the speech of one or more non-standard users along with the previous sampling of users. This is time-consuming and costly, and may actually degrade the models.

Another approach that has been tried is to eliminate the speaker-independent models and match user utterances against a speaker-dependent set of word models specifically created for each non-standard user. This approach, although feasible with the limited vocabulary that may be required in a voice messaging system, does not take advantage of the large amount of work that has been done in the course of preparing speaker-independent models in the areas of modeling the audio characteristics of various speech transmission media (e.g. telephone lines), or in modeling the co-articulation that occurs in streams of continuous speech.

There is thus a need for a speech recognition system that is based on a speaker-independent set of stored words but which can adapt in a speaker-dependent manner to a non-standard speaker without a long training period.

SUMMARY OF THE INVENTION

Accordingly it is an object to provide improved recognition of utterances from a non-standard speaker.

It is a further object of the present invention to provide a speech recognition system based on a speaker-independent set of stored words which can adapt in speaker-dependent manner to utterances from a non-standard speaker.

It is a further object of the present invention to provide speech recognition that does not require a long training period.

It is a further object of the present invention to allow a user to customize a command set, in a speech recognition system.

These and other objects of the invention will become apparent to those skilled in the art from the following description thereof.

In accordance with the teachings of the present invention, some of these and other objects may be accomplished by the present system of speech recognition in which an incoming audio signal is compared against stored models of words, reporting as words portions of the audio signal matching stored models practiced with the present method of providing a set of stored word models derived from utterances of many users and for use by all users, and providing for further use by certain users second sets of stored word models, each set derived from the utterances of one of the certain users and for use only in association with audio signal from that one of the certain users. A portion of incoming audio signal matching a stored model from either set is reported as the corresponding word.

In accordance with an aspect of the present invention, a speech recognition system includes computer memory storing a first set of speaker-independent word models used to match a word in an utterance of a user with a word model in the first set; a second set of speaker dependent word models derived from speech of a particular user and used to match a word in an utterance of the particular speaker; and a program portion used to identify words in utterances of the particular user by attempting to match portions of an audio signal with word models among the first set, and word models among the second set.

In accordance with another aspect of the present invention, a method of operating a speech recognition system includes storing a first set of speaker-independent word models used to match a word in an utterance of any user with a word model in the first set; storing a second set of speaker dependent word models derived from speech of a particular user; recognizing words in utterances of the particular user by attempting to match portions of an audio signal with word models among the first set; and word models among the second set.

In accordance with another aspect of the invention, a method of enhancing speech recognition includes providing a set of user-independent word models derived from utterances of a plurality of speakers; providing a set of user-dependent word models for ones of a plurality of users each derived from utterances of one of the users; matching an utterance from one of the users to one of the user-independent word models; and matching another utterance from the one of the users to one of the user-dependent word models.

In accordance with yet another aspect of the present invention, a method of operating a speech recognition system includes storing a first set of recognition models, for recognizing speech independent of the identity of a user. The first set of recognition models is suitable for recognizing a plurality of system commands. A second set of recognition models, for recognizing speech of a particular user is stored. At least one model of the second set may initiate performance of at least one of the plurality of system commands, so that at least one of the system commands may be performed in response to a recognized user chosen utterance.

In accordance with yet another aspect of the present invention, a voice messaging system includes a speech recognition system for controlling operation of the voice messaging system. The speech recognition system includes memory storing a first set of word models for recognizing speech independent of the identity of a user. The first set of word models is suitable for recognizing a plurality of system commands controlling operation of the voice messaging system. The memory further stores a second set of models for recognizing speech of a particular user, at least one model of the second set for initiating performance of at least one of the plurality of system commands, so that at least one of the system commands may be performed in response to a recognized user chosen word.

In accordance with a further aspect of the invention, a computer readable medium, stores a first set of recognition models, for recognizing speech independent of the identity of a user at a speech recognition system, at least some of the models in the first set for recognizing a plurality of system commands; computer executable instructions, that when executed at the speech recognition system, adapt the speech recognition system to form and store a second set of models, for recognizing speech of a particular user, with at least one model of the second set for initiating performance of at least one of the plurality of system commands, so that at least one of the system commands may be performed in response to a recognized word chosen by the particular user.

BRIEF DESCRIPTION OF THE DRAWINGS

The invention will be more clearly understood by reference to the following detailed description of an exemplary embodiment in conjunction with the accompanying drawings, in which.

DETAILED DESCRIPTION

Figure 1:
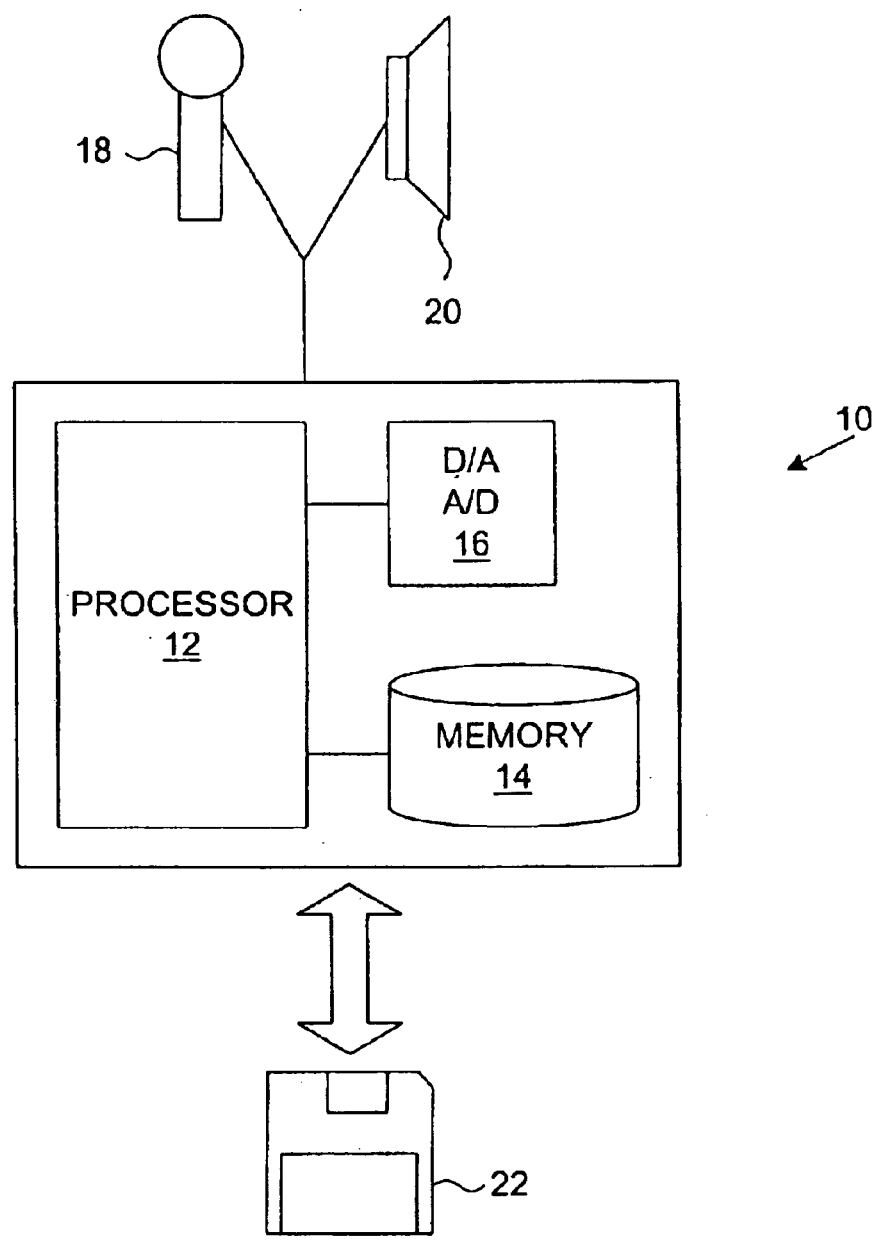
FIG. 1 illustrates a speech recognition system, exemplary of an embodiment of the present invention.

FIG. 1 illustrates a speech recognition system 10, exemplary of an embodiment of the present invention. As illustrated, exemplary recognition system 10 includes a processor 12 in communication with computer readable memory 14. System 10 may further include, or be in communication with an analog to digital (A/D)/digital to analog (D/A) converter 16. A microphone 18 and speaker 20 are in communication with converter 16. Preferably, system 10 forms part of an otherwise conventional telephony voice messaging system. Microphone 18 and speaker 20 may thus be part of a telephone handset, in communication with converter 16, by way of a telephone network such as the public switched telephone network ("PSTN"). Converter 16 could thus form part of system 10, or optionally form part of a digital telephone network. In any event, in the described embodiment, processor 12 is provided with digital data representative of spoken words, in order to recognize speech, in manners exemplary of the present invention.

Software adapting system 10 to function as a voice messaging system, and to function in manners exemplary of the present invention may be stored in memory 14. Similarly a database (described in greater detail below) storing word models used to recognize speech may be stored in memory 14. As will be appreciated, software and data adapting system 10 to function accordingly may be loaded from a computer readable medium 22, which may be a CD-ROM, diskette, tape or other suitable medium.

A vocabulary is determined for a particular application, in a particular language, and perhaps in a particular regional variation of that language. For a voice messaging system to be deployed in the English language, for example, the vocabulary might consist of the names of the ten numerical digits (zero through nine) and appropriate default command words such as PLAY, NEXT, LAST, ERASE, STOP, etc. A group of people deemed to be standard speakers of the language are asked to provide spoken specimens of the vocabulary words. A set of speaker-independent word models is constructed according to a composite or according to an average of those spoken specimens. Possibly, sets of speaker-independent word models are constructed for each of several transmission media (types of telephone terminal equipment, types of telephone networks, etc.).

There may also be speaker-dependent word models for each user, which are constructed, as will be described, from specimens of words or utterances spoken by one or more particular user(s).

Figure 3A:
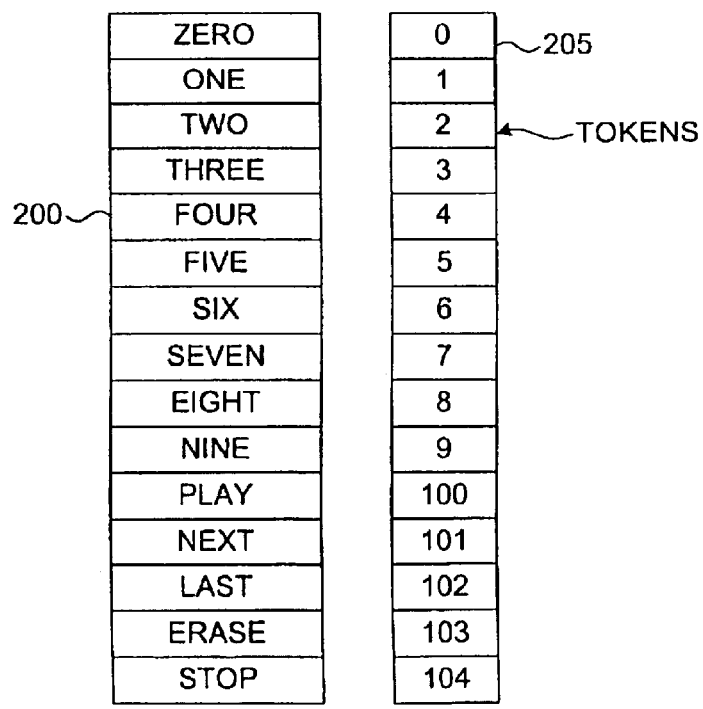
FIG. 3A depicts exemplary stored word models used in the system of FIG. 1.
Figure 3B:
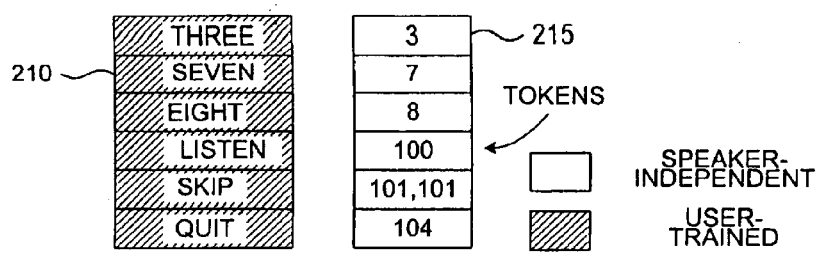
FIG. 3B depicts stored word models for custom commands used in the system of FIG. 1.

A large number of recognition models that may be used for speech recognition will be readily appreciated by persons of ordinary skill in the art. Stored models are preferably stored within a conventional database stored within memory 14 of system 10. Exemplary models 200 and 210 are illustrated in FIGS. 3A and 3B. The remainder of software stored within memory 14 is appropriately adapted to recognize speech using the stored models.

Figure 4:
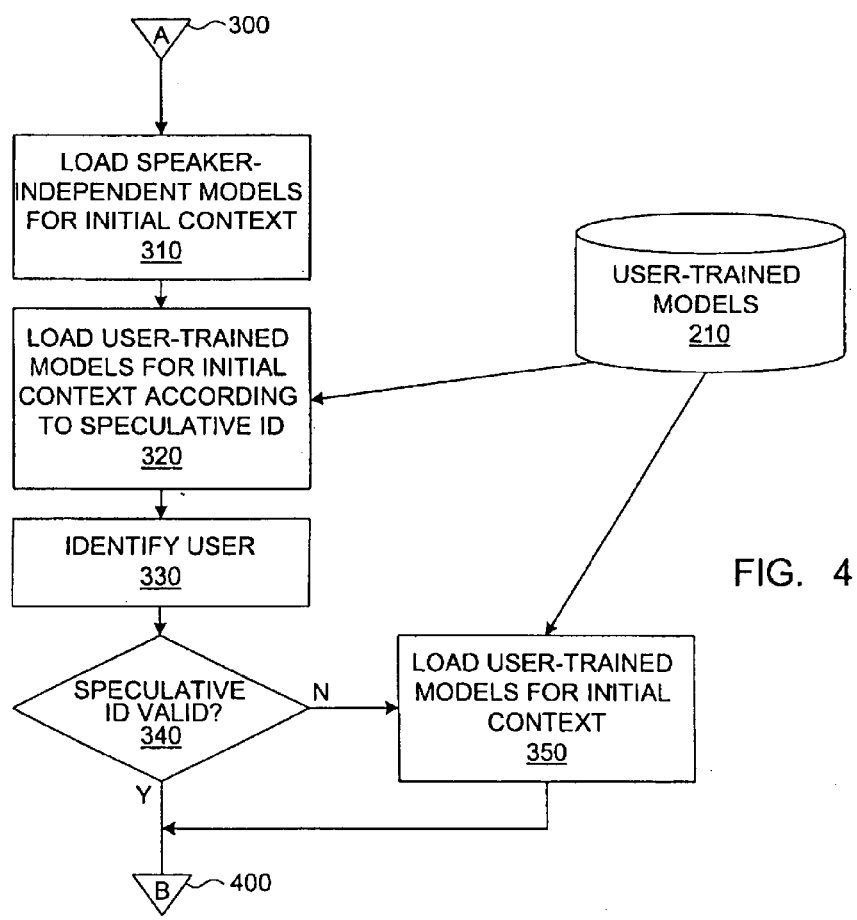
FIG. 4 is a flow chart if actions taken when a user initiates access to the system of FIG. 1 and exemplary of an embodiment of the present invention.

FIG. 4 is a flow chart showing actions taken by system 10 under software control when a user initiates access to a voice messaging system in a manner exemplary of the present invention. The flow is entered at connector 300, and block 310, according to predetermined parameters, establishes an initial "context". The context includes speaker-independent models, in a particular language, for the words that the user is permitted to speak upon initiating access to the system.

The user is speculatively identified according to such factors as the extension from which he is calling. In block 320, any user-trained models 210 (FIG. 3B) that are valid in the present context for the speculatively identified user are loaded. (The generation of user-trained models 210 is discussed below in connection with FIGS. 7 and 8.)

The user provides a login code or a password to positively identify himself, either by spoken utterances or by keypad entries. His code or password is verified in block 330. If the user provided spoken utterances, block 330 interprets these according to the models presently loaded.

Block 340 then determines, according to the user's positive identification, whether the speculative identification made in block 320 was valid. If it was not, block 350 is invoked to load user-trained recognition models corresponding to the identified user and valid in the initial context. These recognition models replace any user-trained models that may have been loaded in block 320.

Figure 5:
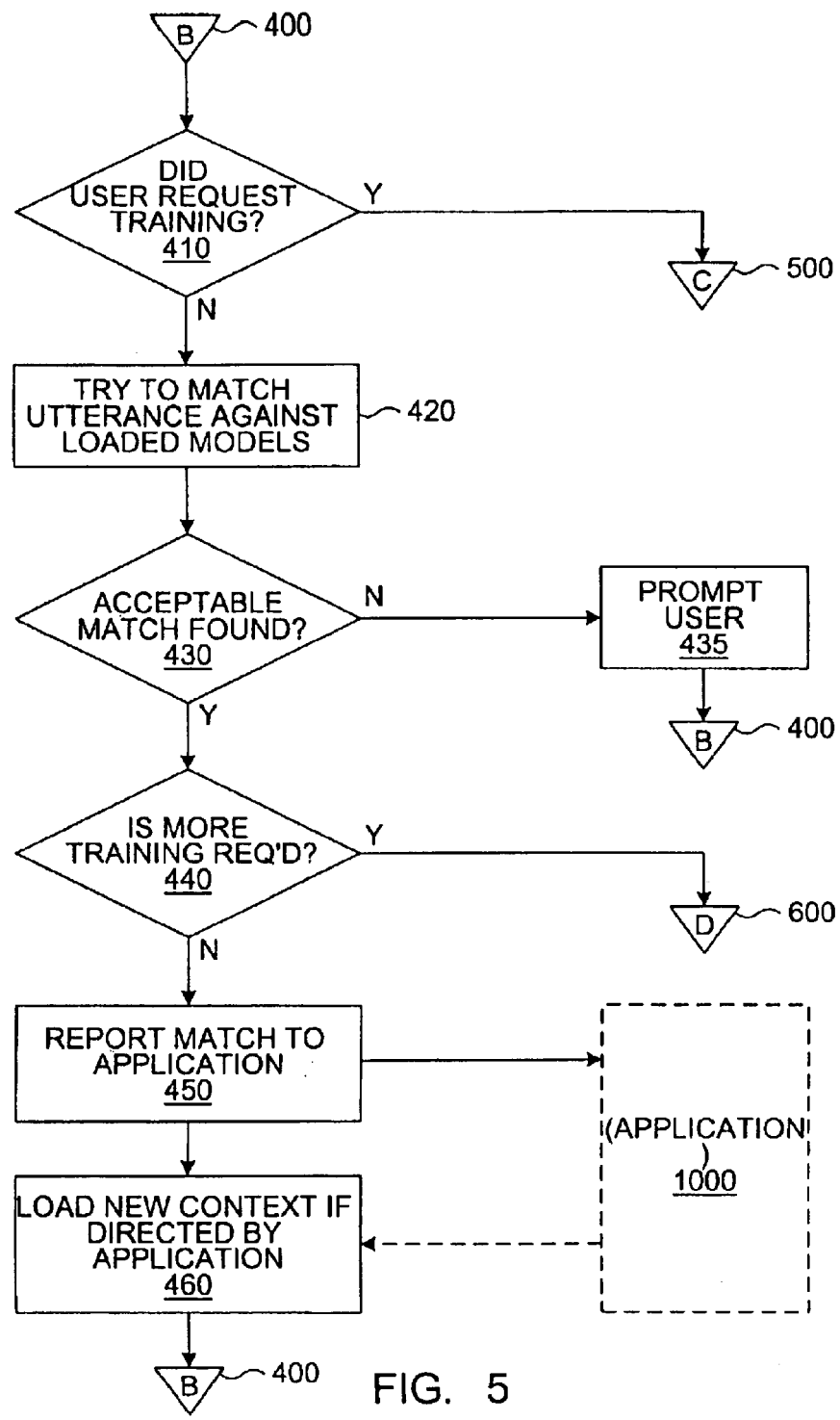
FIG. 5 is a flow chart illustrating recognition of utterances of a user, using the system of FIG. 1 and exemplary of an embodiment of the present invention.

Control then passes, through connector 400, to the process depicted in FIG. 5. A user utterance or a user key-press is awaited.

Block 410 determines, by recognizing the appropriate key-press or by matching the user's utterance against the appropriate one of the stored models, whether the user has requested to train the system. If so, control is dispatched through connector 500 to the flow depicted in FIG. 6 (to be discussed below). As will become apparent, a user may train system 10 in order to add speaker-dependent models for words for which speaker independent models already exist, or for new words or utterances that may initiate commands in place of default commands. Thus, such user-trained, speaker dependent models 210, may be used in order to facilitate recognition of words by system 10 (FIG. 1), or to add custom control commands to the vocabulary of system 10.

If the user has not requested training, block 420 attempts to match the user's utterance against the stored models, which include speaker-independent and user-trained models for the utterance acceptable in the current context in the current language. For some words, there may be two models: one speaker independent and one user-trained. The two models need not represent the same spoken word in the current language. Two words may thus be interpreted as having the same meaning. One word may represent the default word for a system recognized command, the other may represent a user preferred word or utterance, for which a speaker dependent recognition model is stored within user trained models 210. In block 420, an indication is preferably generated of the word with the best probability of matching the user's utterance, and an assessment of that probability.

Block 430 determines whether the probability of a match exceeds a predetermined threshold (i.e., whether it may be supposed that an actual match, as opposed to a mere similarity, has been found). If not, the user is informed by block 435 that his utterance does not match any of the words acceptable in the current context. He may be informed of what words are valid in the current context, and control returns to connector 400, where the user may re-attempt to speak a word or he may request to enter training through block 410.

After an acceptable match is found, block 440 may determine that more training is required for the matched word, according to such criteria as the number of attempts required to match the word and the match probability. Control could then pass through connector 600 to the flow depicted in FIG. 7 (to be discussed below). Alternatively, a marginally recognized spoken word (I.e. a word for which the calculated probability of match is slightly (for example 5–10%) below the desired preset threshold for correct recognition) may be used to form an additional word model to be added to models 210. That is, memory permitting, models 210 could be updated to include acceptable, but somewhat deviant, pronunciations of recognized words. Prior to storing such a marginally recognized model, a user may be prompted to confirm that the marginal recognition is indeed correct. Optionally, such models could be deleted if not used for recognition for a set period of time, or as memory 14 used to store models 210 fills.

Block 450 reports the matched word or utterance to the main application 1000, which executes the actions requested by the user. The matched word or utterance may be reported as data representing a text version of the word, or as one or more tokens indicative of the word, understood by application 1000. Each token may for example represent one word within the default set of words understood by the system, as illustrated by tokens 205 and 215 in FIGS. 3A and 3B. For recognized words representing compound commands, multiple tokens may be provided to application 1000, as illustrated in FIG. 3B. Application 1000 may be a portion of system 10 enabling system 10 to act as a voice messaging system, exemplary an embodiment of the present embodiment. Specifics of system 10, adapting it to act as an otherwise conventional voice messaging system will be appreciated by a person of ordinary skill in the art, and will thus not be discussed herein.

Application 1000 accordingly processes the recognized word or utterance. If the recognized word or utterance represents a command or series of commands, application 1000 may process the command(s). Alternatively, if the recognized word represents multiple default commands, a series of commands will be executed by application 1000.

According to the word spoken by the user, the application may instruct block 460 that a new context is to take effect. For example, the user may have spoken a command such as CALL, indicating that he wishes to place a call; the new context would be established in which the user could speak the digits of the called party's number, but in which he could not speak command words such as CALL. If a new context is to be loaded, block 460 loads speaker-independent word models and user-trained models (if any) of words valid in the new context.

Control then passes to connector 400 to repeat the flow of FIG. 4 for the next user utterance or key-press.

Figure 6:
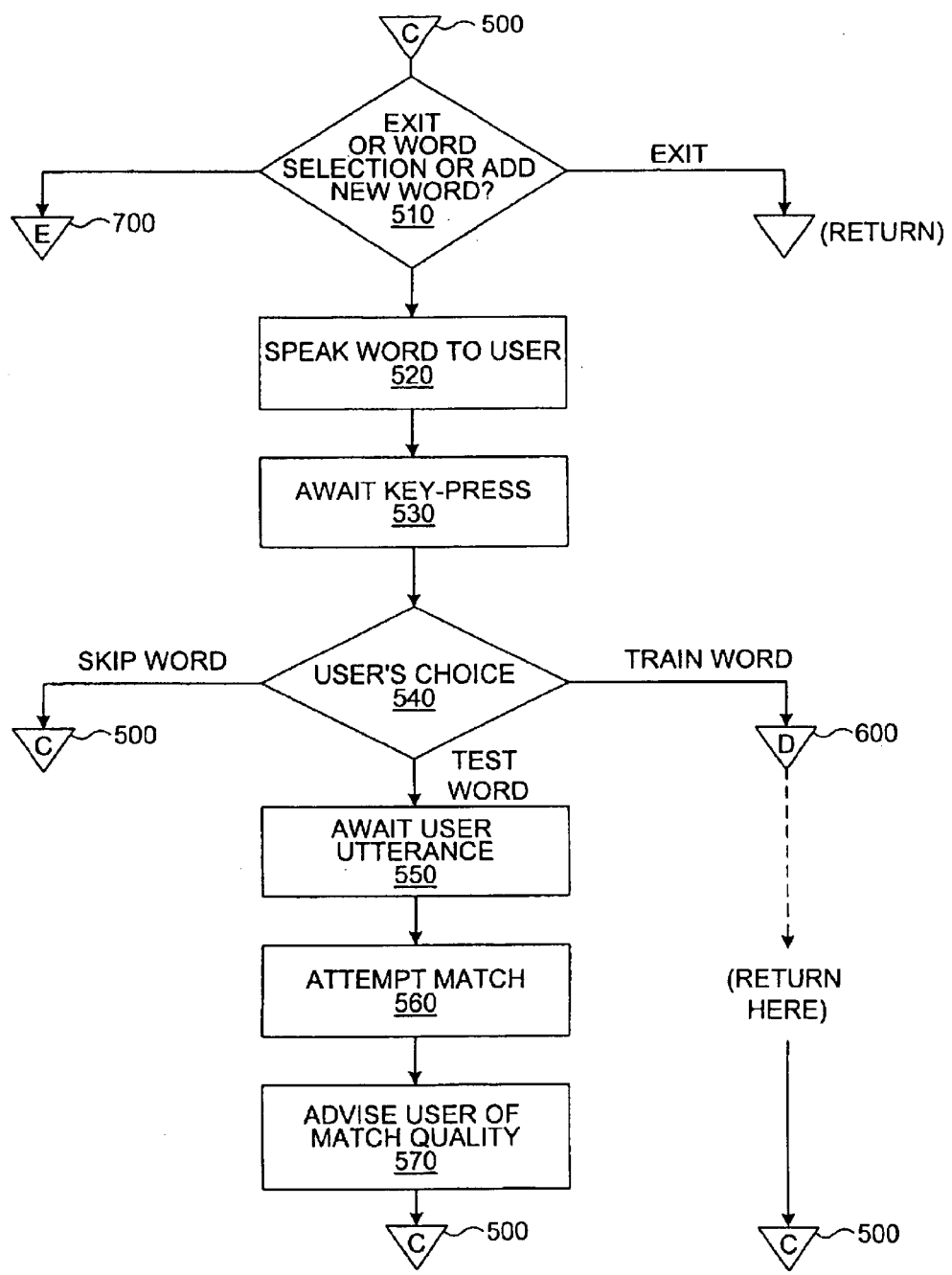
FIG. 6 is a flowchart depicting user training of word models and user testing of word models using the system of FIG. 1, and exemplary of an embodiment of the present invention.
Figure 8A:
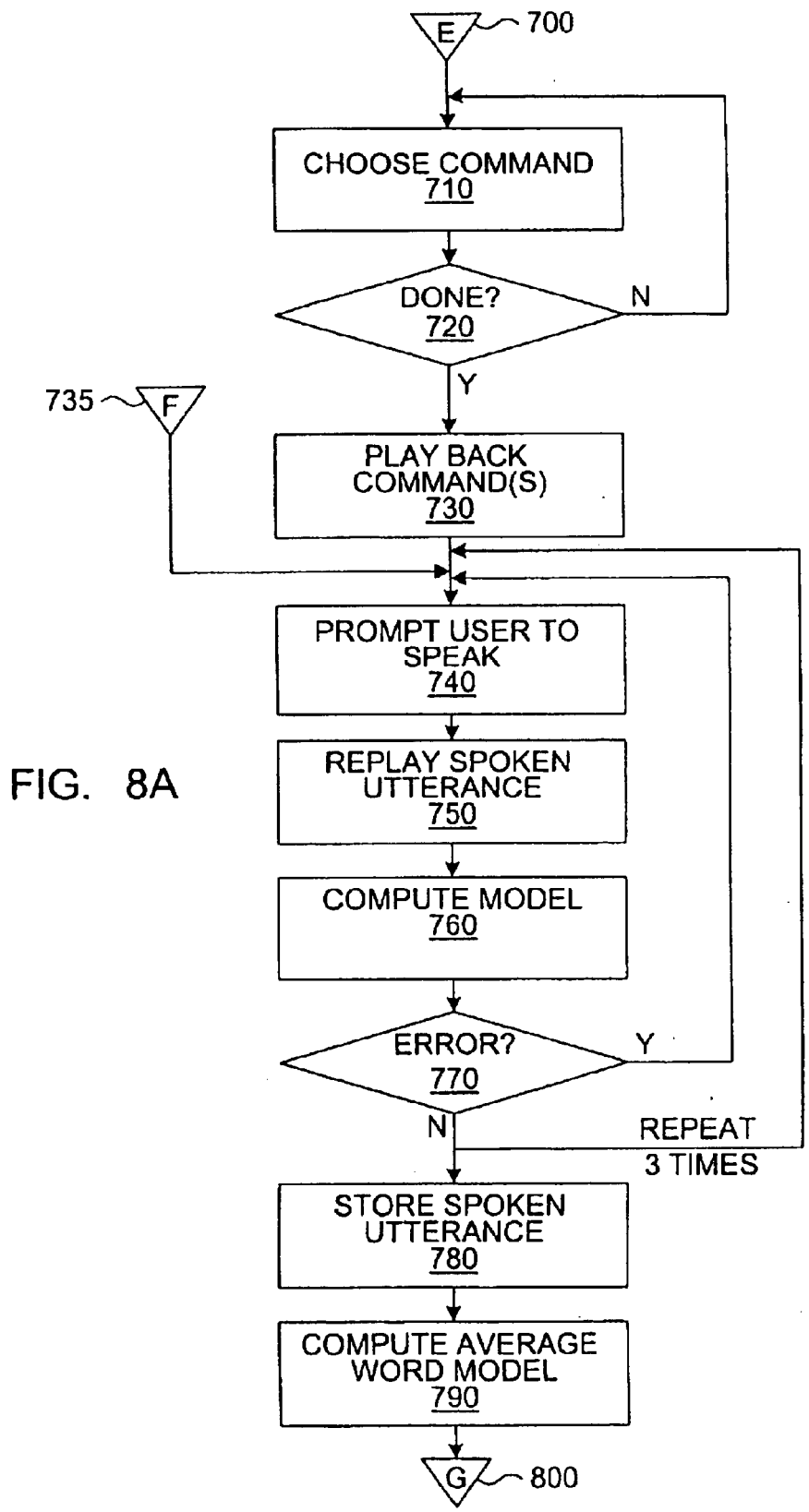
FIGS. 8A and 8B are flowcharts depicting the generation of a user-trained model for a custom command to be added to the system of FIG. 1, in a manner exemplary of an embodiment of the present invention.
Figure 8B:
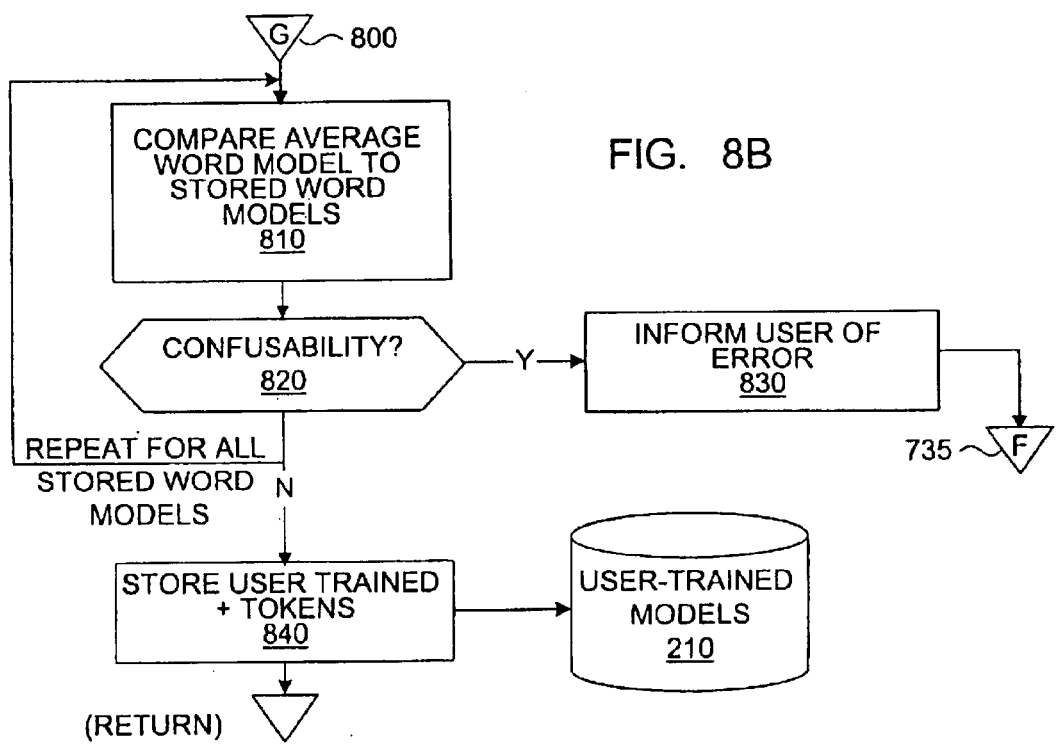

FIG. 6 is entered through connector 500 when the user requests to train the system. Block 510 may be used at any time to return the user back to the previous flow when he so requests by pressing a predetermined key on his keypad. At this point, a user may also choose to add a new utterance to the existing vocabulary of command words, and may be so prompted. If this latter selection is made, the flow depicted in FIGS. 8A and 8B is preferably entered at connector 700, as later described.

If a user wishes to program system 10 to include user-dependent versions of existing recognized words, he may press a key that directs block 520 to speak to him a word from the vocabulary of the current language. In block 520, system 10 may replay the word from the default vocabulary to be programmed. In the event an alternative word has been pre-programmed, then a recording of this alternate word may likewise be replayed. (Each pass through the flow of FIG. 6 will use a different one of the words.) He then may press predetermined keys that block 530 passes to block 540 for interpretation as whether he wishes to skip, test, or train the word. Skipping the word simply returns him to connector 500 where he may exit training system 10 or go on to the next sequential word.

If he requests testing the utterance, he speaks the utterance and block 560 attempts to match this utterance of a word or words against stored model(s) of it (the speaker-independent model, and the user-trained model if there is one). Block 570 advises him of the quality of the match, and returns him for another pass through the flow of FIG. 6.

If the user elects to train the word, control is dispatched to the flow of FIG. 7, to be discussed below. Upon returning therefrom, the user is dispatched to another pass through the flow of FIG. 5.

Figure 7:
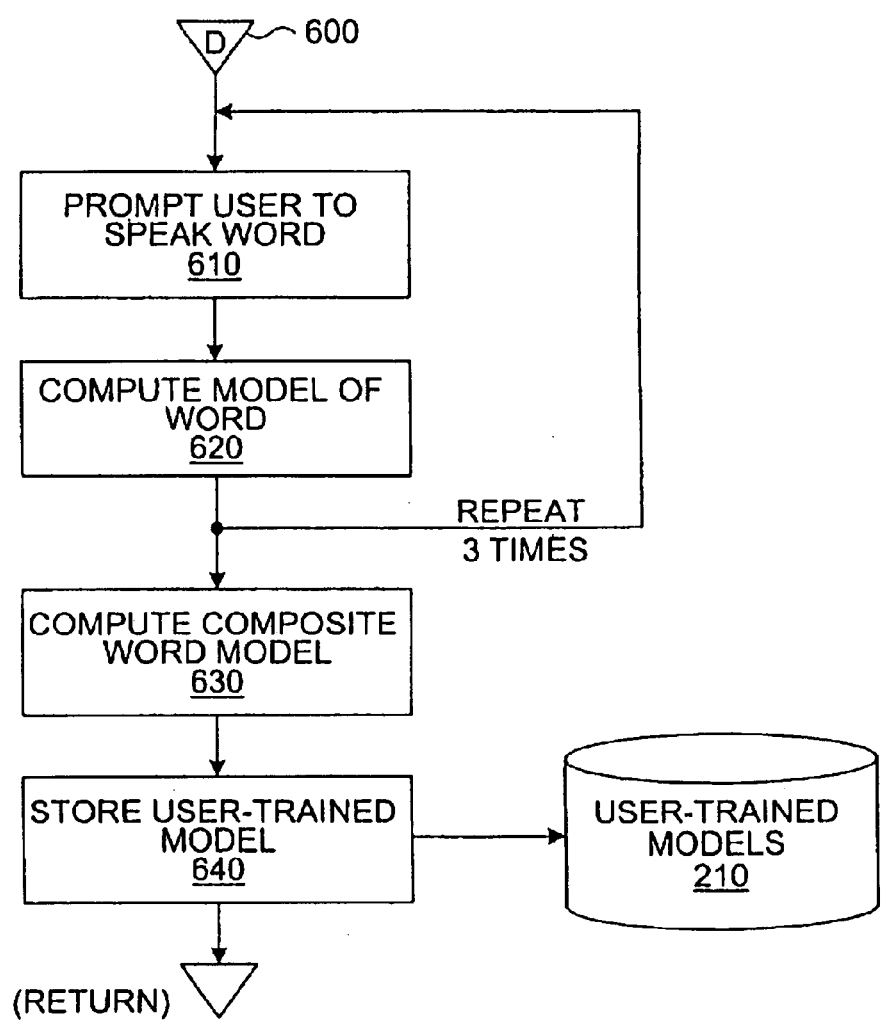
FIG. 7 is a flowchart depicting the generation of a user-trained word model used in the system of FIG. 1 and exemplary of an embodiment of the present invention.

FIG. 7 is entered through connector 600 when a user has requested to train a word, or when the flow of FIG. 5 has determined that he should train a word. The word to be trained is known upon entry to blocks 610 and 620, which are repeated a number of times (three in a preferred embodiment). Block 610 prompts the user to speak the word, and block 620 computes a model of the word.

Block 630 computes a composite model from the models computed by the multiple executions of block 620. Block 640 stores the composite model thus computed in user-trained models 210 in a storage area within memory 14 of system 10 associated with the current user.

Blocks illustrated in FIGS. 8A and 8B entered through connector 700 are performed in response to a user choosing to add a new utterance and corresponding model to commands of the existing vocabulary in block 510 (FIG. 6). In the event the user wishes to add a model representing a new utterance to the vocabulary, the user may be prompted in blocks 710 and 720 to scroll through default system commands to select one or more commands to be represented by the newly added model. A plurality of system commands may be represented by an utterance defined by a single speaker dependent model. Thus, for example, a user could define a compound command from several system commands. The user may separate system commands by entering a suitable delimiter. Each command or compound command could be represented by a single word, or an utterance of several words, for which an appropriate model would be stored within models 210. Once the user has completed entry of system commands to be represented by the newly added utterance, the user may enter or speak another suitable delimiter, such as a key press representing a "*" or "#" to continue with block 730. In block 730, the combined system commands may optionally be played back to the user, allowing the user to hear the sequential commands to be represented by any newly added utterance. Next, in block 740 the user is prompted to speak a suitable utterance, for which a user-trained model is to be stored in block 840 (FIG. 8B). System 10 optionally replays the utterance for the user's benefit in block 750. This stored utterance may also be used in replaying valid words to the user in block 435 (FIG. 5). In step 760, a model of the utterance is computed. Optionally, blocks 730 and onward are repeated multiple times, in order to calculate multiple models for the word. Preferably, three independent models are calculated. In the event one model deviates considerably from another as determined in block 770, the user may be prompted to re-perform steps leading up to formation of the deviant model. A representative version of the spoken utterance may optionally be stored for future reproduction in block 780. After a suitable number of models have been captured, a composite word model is computed by block 790. Next, a confusability test for the calculated model is performed in blocks 810–830 (FIG. 8B). Many suitable techniques for administering confusability tests will be known to those of ordinary skill in the art. U.S. Pat. No. 5,664,058 describes one such technique. Specifically, the computed average model may be compared to models stored within word models 200 and models 210. In the event the average model too closely resembles another stored word model, so that recognition is difficult and confusion is likely to occur when the system is used, the user is prompted to choose another utterance for the desired command in block 830. Thereafter, the user is prompted to re-train the utterance and blocks 740 and onward are repeated through entry at connector 735

(FIG. 8A). Once a model passing the confusability test is computed, it is stored in step 840 with the remaining user trained models 210 within memory 14 of system 10, and training is exited. A corresponding token representing the command or commands representing the stored words may also be stored with the user trained models 210.

Figure 2:
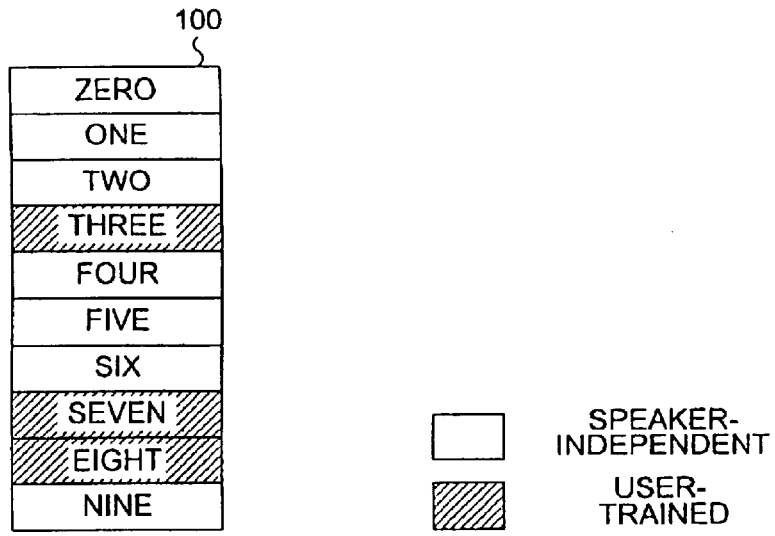
FIG. 2 depicts conventional stored word models.

FIGS. 2, 3A and 3B show conventional word models (FIG. 2) and word models used with exemplary embodiments of the present invention (FIGS. 3A, 3B). Unlike the practice in conventional systems, user-trained models 210 (FIG. 3A) exemplary of an embodiment of the present invention do not replace the corresponding speaker-independent models 200. Thus, if a user is not properly identified as discussed above, a good likelihood still exists that his utterances can be matched, at least in the speaker-independent models. Similarly, if a user calls in on a telephone connection that has markedly different or degraded characteristics from his normal connection there is still a good likelihood of recognizing his utterances.

Thus, word models 210 correspond to commands for which speaker independent models 210 are stored. As illustrated, each of word models 200 may be associated with one of command tokens 205, representative of how a recognized word is to be processed by system 10. Each of speaker dependent word models 210, on the other hand, is associated with one or more tokens 215 corresponding to the token associated with the speaker independent word model in for that word amongst word models 210, or as determined in block 710. Thus, in the example illustrated in FIGS. 3A and 3B, the speaker dependent word models for the words THREE, SEVEN and EIGHT correspond to the tokens for speaker independent word models of these words. Similarly, the word model for LISTEN is associated with the token conventionally associated with the default PLAY command. Similarly, the word model associated with the word SKIP is associated with two tokens, representing the NEXT command. Thus, the word SKIP will effectively be recognized as the command associated with repeating the word NEXT twice. Lastly the example speaker dependent word model for the word QUIT is associated with the command token associated with the STOP command. As such, the word QUIT when recognized will be interpreted as the command associated with the utterance of the default command STOP.

This ability for user-trained models to co-exist with speaker-independent models allows the "coverage" of speaker-independent models to be extended to cover regional differences in speech; for example, a set of American-English-language models may be directly usable for most users who speak standard American English, while users whose pronunciation of certain words may be affected by regional variations can train those particular words.

Similarly, for voice commands, recognition models for custom voice commands as well as models for default commands may be stored as illustrated in FIGS. 3A and 3B. A custom utterance may be added to the command set. This custom utterance may be used to initiate the same command as a word within the default command set. Commands may thus be associated with tokens interpreted by system 10. Tokens representing the meaning of custom commands may be stored in conjunction with the word models for such commands. As such, a custom word may be used to initiate a plurality of commands, otherwise initiated by multiple words within the default command set. A user may thus simplify use of the system 10 to correspond to the user's preferences. The system may be configured so that commands correspond to those with which the user is accustomed. Similarly, the user may store word models representative of macros, represented by a chosen utterance and interpreted as a series of commands. As will be appreciated, these macros could be further associated with spoken numbers recognized by system 10, so that these macros may be used to speed dial extensions, and the like.

It will thus be seen that the invention efficiently attains at least some of the objects set forth above, among those made apparent from the preceding description. In particular, the invention provides enhanced speech recognition of non-standard users without requiring a long training period and with adaptation to a variety of characters and qualities of transmission media, and allows a user to use custom words as system commands. Those skilled in the art will appreciate that the configurations depicted in FIGS. 1, 3A, 3B, 4, 5, 6, 7, 8A and 8B and their supporting discussion in the specification provide enhanced speech recognition meeting these objects.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by Letters Patent is:

1. A speech recognition system comprising computer memory storing:
   a first set of speaker-independent word models used to match a word in an utterance of a user with a word model in said first set, wherein said first set of word models includes models for each of a plurality of words;
   a second set of speaker dependent word models derived from speech of a particular user and used to match a word in an utterance of said particular user, wherein said second set of word models includes models for at least some of said plurality of words; and
   a program portion used to identify words in utterances of said particular user by attempting to match portions of an audio signal with:
   word models among said first set; and
   word models among said second set,
   wherein said identified words in the utterances of said particular user include user-selected words for invoking commands.

2. A method of operating a speech recognition system comprising:
   storing a first set of speaker-independent word models used to match a word in an utterance of any user with a word model in said first set, said first set of word models including models for each of a plurality of words;
   storing a second set of speaker dependent word models derived from speech of a particular user, said second set of word models including models for at least some of said plurality of words and at least one model of said second set chosen by said particular user to initiate performance of at least one of a plurality of system commands;
   recognizing words in utterances of said particular user by attempting to match portions of an audio signal with:

word models among said first set; and word models among said second set; and performing at least one system command in response to a recognized word within said utterances of said particular user.

3. The method according to claim 2 further comprising:

inviting said particular user to speak training utterances of a word upon a predetermined number of failures to recognize said word using said first set of word models;

deriving a word model from said training utterances; and storing said word model from said training utterances, in said second set.

4. A method of operating a speech recognition system comprising:

storing a first set of speaker-independent word models used to match a word in an utterance of any user with a word model in said first set;

storing a second set of speaker dependent word models derived from speech of a particular user by:

inviting said particular user upon first use of said speech recognition system to speak training words for deriving said second set;

deriving said second set from said training words; and storing said second set;

associating at least one stored word model with a command token also associated with a default command word model; and recognizing words in utterances of said particular user by attempting to match portions of an audio signal with:

word models among said first set; and word models among said second set.

5. A method of operating a speech recognition system comprising:

storing a first set of speaker-independent word models used to match a word in an utterance of any user with a word model in said first set;

storing a second set of speaker dependent word models derived from speech of a particular user by:

determining a likelihood of recognizing a spoken word using said first set;

deriving a word model from a spoken word marginally recognized using said first set;

storing said word model in said second set; and recognizing words in utterances of said particular user by attempting to match portions of an audio signal with:

word models among said first set; and word models among said second set.

6. A method of enhancing speech recognition comprising:

providing a set of user-independent word models derived from utterances of a plurality of speakers, said set of user-independent word models including models for each of a plurality of words;

providing a set of user-dependent word models for ones of a plurality of users each derived from utterances of one of said users, said set of user-dependent word models including models for at least some of said plurality of words;

matching an utterance from one of said users to one of said user-independent word models;

matching an other utterance from said one of said users to one of said user-dependent word models; and responsive to matching either said utterance to said one of said user-independent word models or said other utterance to said one of said user-dependent word models, initiating a command associated with both said one of said user-independent word models and said one of said user-dependent word models.

7. A method of enhancing speech recognition comprising:

providing a set of user-independent word models derived from utterances of a plurality of speakers, at least one user-independent word model representing a first word and associated with a command token;

providing a set of user-dependent word models for ones of a plurality of users each derived from utterances of one of said users, at least one user-dependent word model representing a second word different than the first word and associated with said command token, said user-dependent word models each derived by:

inviting a new user to speak training words for deriving a set of user-dependent word models;

deriving said set of user-dependent models from said training words;

storing said set of user-dependent word models; and associating a user-dependent word model with a command token designated by said one of said users;

matching an utterance from one of said users to one of said user-independent word models; and matching an other utterance from said one of said users to one of said user-dependent word models.

8. The method according to claim 7 further comprising:

inviting said new user to speak training utterances of a word upon a predetermined number of failures to identify said word among said user-independent word models when no model for said word is present in said user-dependent models;

deriving a word model from said training utterances; and storing the derived word model in said set of user-dependent word models.

9. The method according to claim 8 wherein said user-dependent word models are stored in a separate memory location from said user-dependent word models.

* * * * *

UNITED STATES PATENT AND TRADEMARK OFFICE
CERTIFICATE OF CORRECTION

PATENT NO. : 6,873,951 B1
DATED : March 29, 2005
INVENTOR(S) : Lin Lin et al.

It is certified that error appears in the above-identified patent and that said Letters Patent is hereby corrected as shown below:

Column 1,
Line 8, delete "09/281,078 filed Mar. 30, 1999 now".

Column 6,
Line 56, delete "I.e." and insert -- i.e. --.

Column 12,
Line 52, delete "user-dependent" and insert -- user-independent --.

Signed and Sealed this

Sixteenth Day of August, 2005

JON W. DUDAS
*Director of the United States Patent and Trademark Office*